US012273856B2

(12) United States Patent
Luetzenkirchen

(10) Patent No.: US 12,273,856 B2
(45) Date of Patent: Apr. 8, 2025

(54) MUSIM UE CONNECTION RELEASE, PAGING RESTRICTION AND REJECTION

(71) Applicant: Intel Corporation, Santa Clara, CA (US)

(72) Inventor: Thomas Luetzenkirchen, Taufkirchen (DE)

(73) Assignee: Intel Corporation, Santa Clara, CA (US)

( * ) Notice: Subject to any disclaimer, the term of this patent is extended or adjusted under 35 U.S.C. 154(b) by 285 days.

(21) Appl. No.: 17/742,017

(22) Filed: May 11, 2022

(65) Prior Publication Data

US 2022/0272660 A1     Aug. 25, 2022

Related U.S. Application Data

(60) Provisional application No. 63/188,400, filed on May 13, 2021.

(51) Int. Cl.
*H04W 68/02* (2009.01)
*H04W 4/50* (2018.01)
*H04W 76/30* (2018.01)
*H04W 88/06* (2009.01)

(52) U.S. Cl.
CPC ............ *H04W 68/02* (2013.01); *H04W 4/50* (2018.02); *H04W 76/30* (2018.02); *H04W 88/06* (2013.01)

(58) Field of Classification Search
CPC ... H04W 68/02; H04W 68/005; H04W 76/30; H04W 76/36; H04W 76/15; H04W 76/25; H04W 60/03; H04W 48/16; H04W 60/06

USPC .......................................................... 370/329
See application file for complete search history.

(56) References Cited

U.S. PATENT DOCUMENTS

| 12,004,251 | B2* | 6/2024 | Kumar | H04W 68/005 |
| 2022/0272660 | A1* | 8/2022 | Luetzenkirchen | H04W 68/02 |
| 2022/0312548 | A1* | 9/2022 | Kumar | H04W 76/36 |
| 2022/0322481 | A1* | 10/2022 | Kumar | H04W 76/30 |
| 2022/0345875 | A1* | 10/2022 | Kumar | H04W 60/06 |
| 2022/0361143 | A1* | 11/2022 | Kumar | H04W 68/005 |

(Continued)

OTHER PUBLICATIONS

Y. Chen et al., "Bookworm Game: Automatic Discovery of LTE Vulnerabilities Through Documentation Analysis," 2021 IEEE Symposium on Security and Privacy (SP), San Francisco, CA, USA, 2021, pp. 1197-1214, doi: 10.1109/SP40001.2021.00104. (Year: 2021).*

*Primary Examiner* — William D Cumming
(74) *Attorney, Agent, or Firm* — Schwegman Lundberg & Woessner, P.A.

(57) ABSTRACT

An apparatus and system for a multiple universal subscriber identity module (MUSIM) user equipment (UE) are described. Due to activity on another USIM, the MUSIM UE transmits a service request message to release an N1 non-access stratum (NAS) signaling connection or reject a paging request received from the network, dependent on whether the MUSIM UE is in a $5^{th}$ generation (5G) Mobility Management (5GMM)-CONNECTED mode or a 5GMM-IDLE mode. The service request message may contain a paging restriction that restrict paging to: all paging, all paging except for paging for voice service, all paging except for packet data unit (PDU) session(s), and all paging except for voice service and PDU session(s).

20 Claims, 10 Drawing Sheets

(56) References Cited

U.S. PATENT DOCUMENTS

| | | | |
|---|---|---|---|
| 2023/0087650 A1* | 3/2023 | Watfa | H04W 48/16 370/329 |
| 2024/0324053 A1* | 9/2024 | Kumar | H04W 76/30 |

* cited by examiner

MUSIM UE CONNECTION RELEASE, PAGING RESTRICTION AND REJECTION

PRIORITY CLAIM

This application claims the benefit of priority to U.S. Provisional Patent Application Ser. No. 63/188,400, filed May 13, 2021, which is incorporated herein by reference in its entirety.

TECHNICAL FIELD

Embodiments pertain to next generation (NG) wireless communications. In particular, some embodiments relate to devices with multiple universal subscriber identity modules (MUSIM).

BACKGROUND

The use and complexity of next generation (NG) or new radio (NR) wireless systems, which include 5G networks and are starting to include sixth generation (6G) networks among others, has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated. As expected, a number of issues abound with the advent of any new technology, including support for MUSIM devices.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
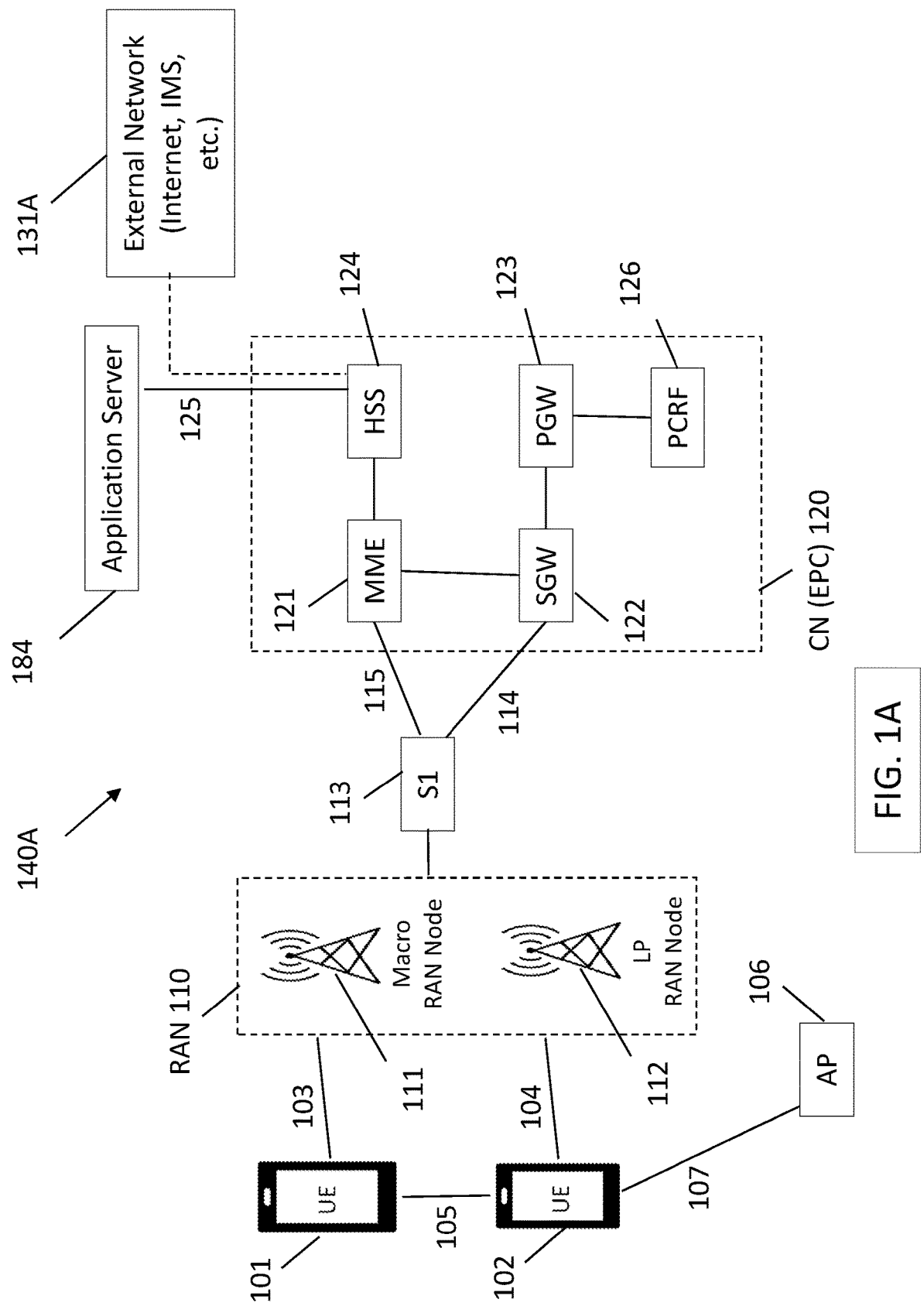
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G functions. Accordingly, although 5G will be referred to, it is to be understood that this is to extend as able to 6G structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The RAN 110 may contain one or more gNBs, one or more of which may be implemented by multiple units. Note that although gNBs may be referred to herein, the same aspects may apply to other generation NodeBs, such as $6^{th}$ generation NodeBs— and thus is more generally referred to as Radio Access Network node (RANnode).

Each of the gNBs may implement protocol entities in the 3GPP protocol stack, in which the layers are considered to be ordered, from lowest to highest, in the order Physical (PHY), Medium Access Control (MAC), Radio Link Control (RLC), Packet Data Convergence Control (PDCP), and Radio Resource Control (RRC)/Service Data Adaptation Protocol (SDAP) (for the control plane/user plane). The protocol layers in each gNB may be distributed in different units—a Central Unit (CU), at least one Distributed Unit (DU), and a Remote Radio Head (RRH). The CU may provide functionalities such as the control the transfer of user data, and effect mobility control, radio access network sharing, positioning, and session management, except those functions allocated exclusively to the DU.

The higher protocol layers (PDCP and RRC for the control plane/PDCP and SDAP for the user plane) may be implemented in the CU, and the RLC and MAC layers may be implemented in the DU. The PHY layer may be split, with the higher PHY layer also implemented in the DU, while the lower PHY layer is implemented in the RRH. The CU, DU and RRH may be implemented by different manufacturers, but may nevertheless be connected by the appropriate interfaces therebetween. The CU may be connected with multiple DUs.

The interfaces within the gNB include the E1 and fronthaul (F) F1 interface. The E1 interface may be between a CU control plane (gNB-CU-CP) and the CU user plane (gNB-CU-UP) and thus may support the exchange of signaling information between the control plane and the user plane through E1AP service. The E1 interface may separate Radio Network Layer and Transport Network Layer and enable exchange of UE associated information and non-UE associated information. The E1AP services may be non UE-associated services that are related to the entire E1 interface instance between the gNB-CU-CP and gNB-CU-UP using a non UE-associated signaling connection and UE-associated services that are related to a single UE and are associated with a UE-associated signaling connection that is maintained for the UE.

The F1 interface may be disposed between the CU and the DU. The CU may control the operation of the DU over the F1 interface. As the signaling in the gNB is split into control plane and user plane signaling, the F1 interface may be split into the F1-C interface for control plane signaling between the gNB-DU and the gNB-CU-CP, and the F1-U interface for user plane signaling between the gNB-DU and the gNB-CU-UP, which support control plane and user plane separation. The F1 interface may separate the Radio Network and Transport Network Layers and enable exchange of UE associated information and non-UE associated information. In addition, an F2 interface may be between the lower and upper parts of the NR PHY layer. The F2 interface may also be separated into F2-C and F2-U interfaces based on control plane and user plane functionalities.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1U interface 114, which carries traffic data between the RAN nodes 111 and 112 and the serving gateway (S-GW)

122, and the S1-mobility management entity (MME) interface 115, which is a signaling interface between the RAN nodes 111 and 112 and MMES 121.

In this aspect, the CN 120 comprises the MMES 121, the S-GW 122, the Packet Data Network (PDN) Gateway (P-GW) 123, and a home subscriber server (HSS) 124. The MMES 121 may be similar in function to the control plane of legacy Serving General Packet Radio Service (GPRS) Support Nodes (SGSN). The MMES 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a core network (CN) 120. The NG-RAN 110 can include a plurality of nodes, such as gNBs and NG-eNBs. The CN 120 (e.g., a 5G core network (5GC)) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
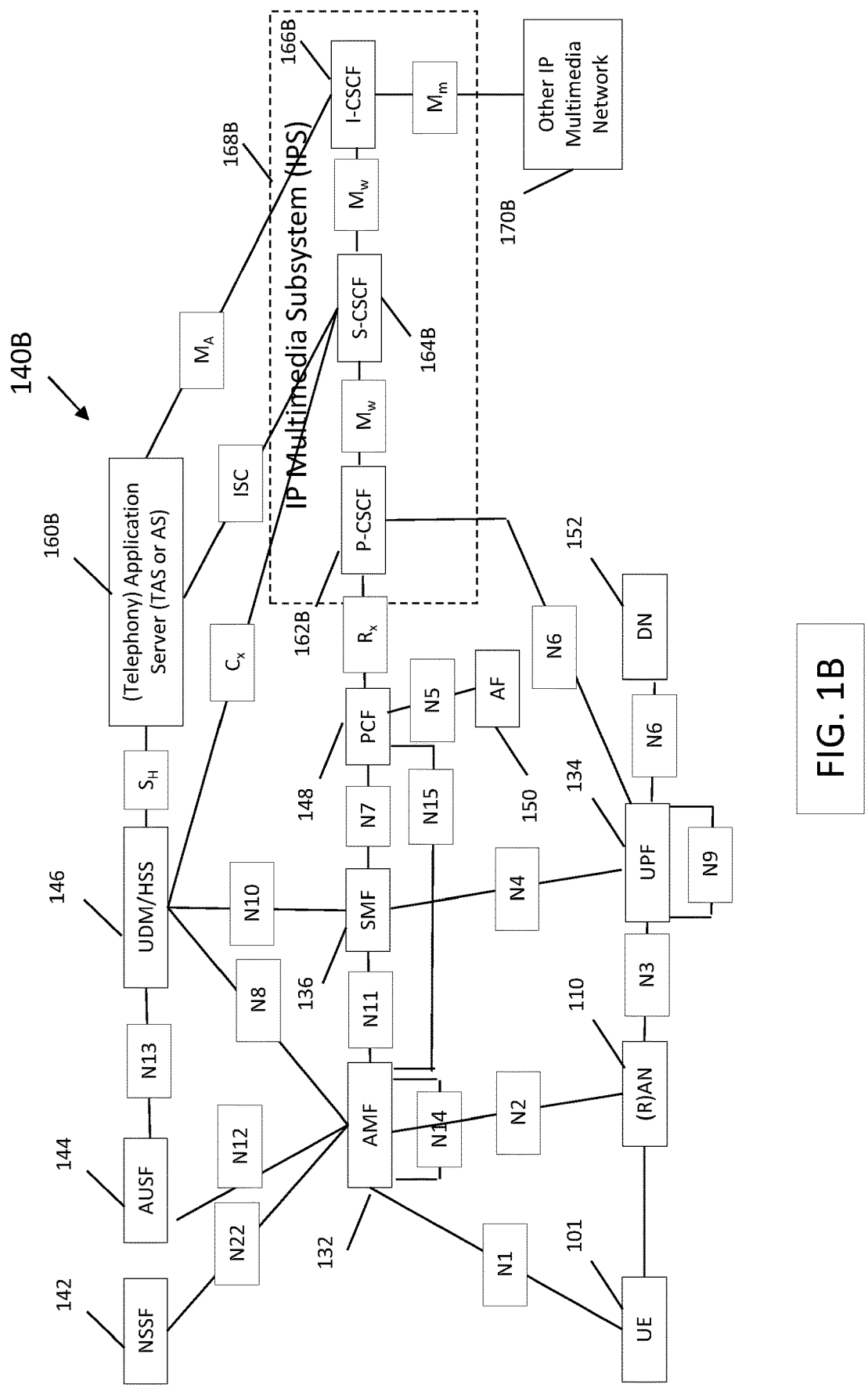
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other CN network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170B, e.g. an IMS operated by a different network operator.

In some aspects, the UDM/HSS 146 can be coupled to an application server (AS) 160B, which can include a telephony application server (TAS) or another application server. The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
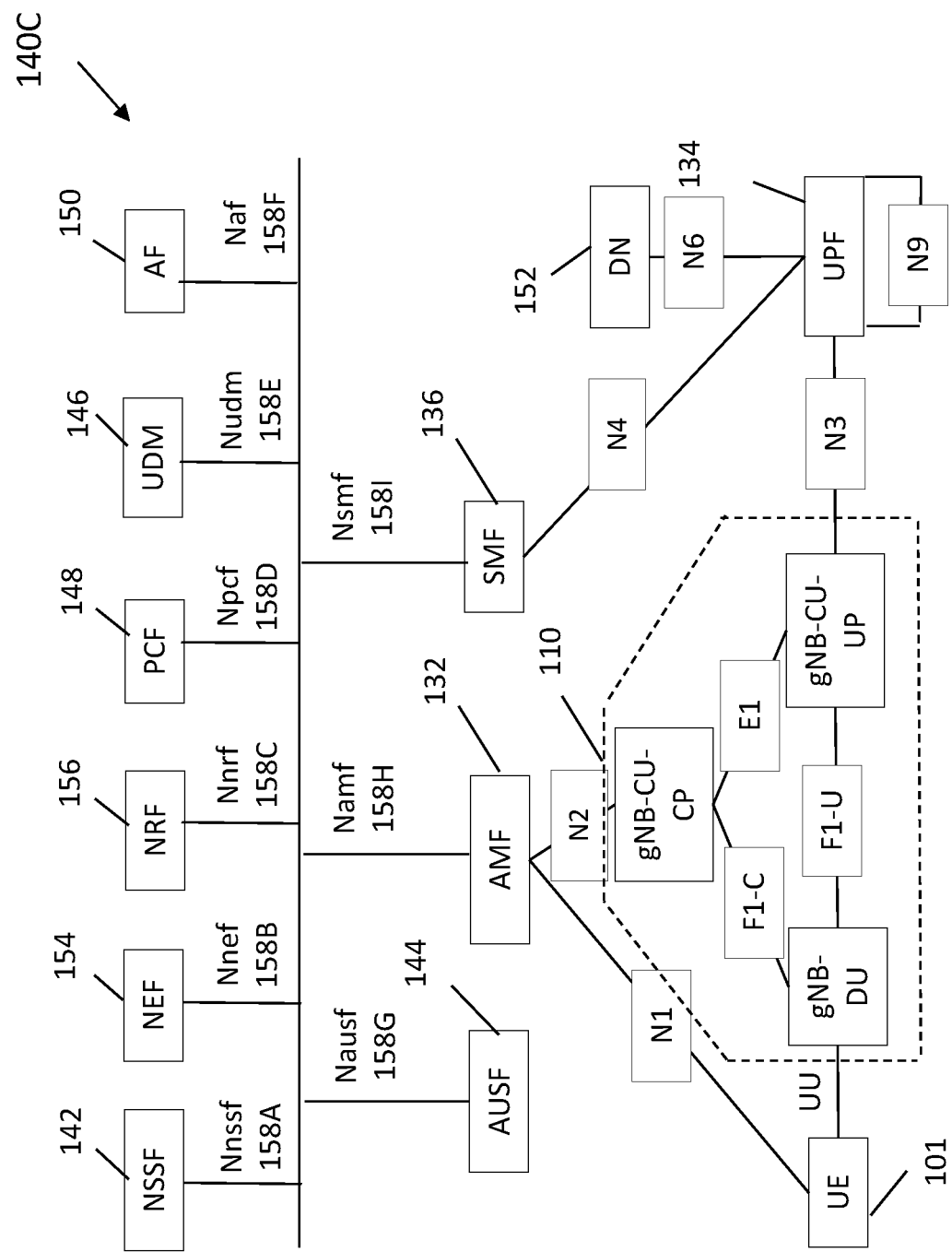
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
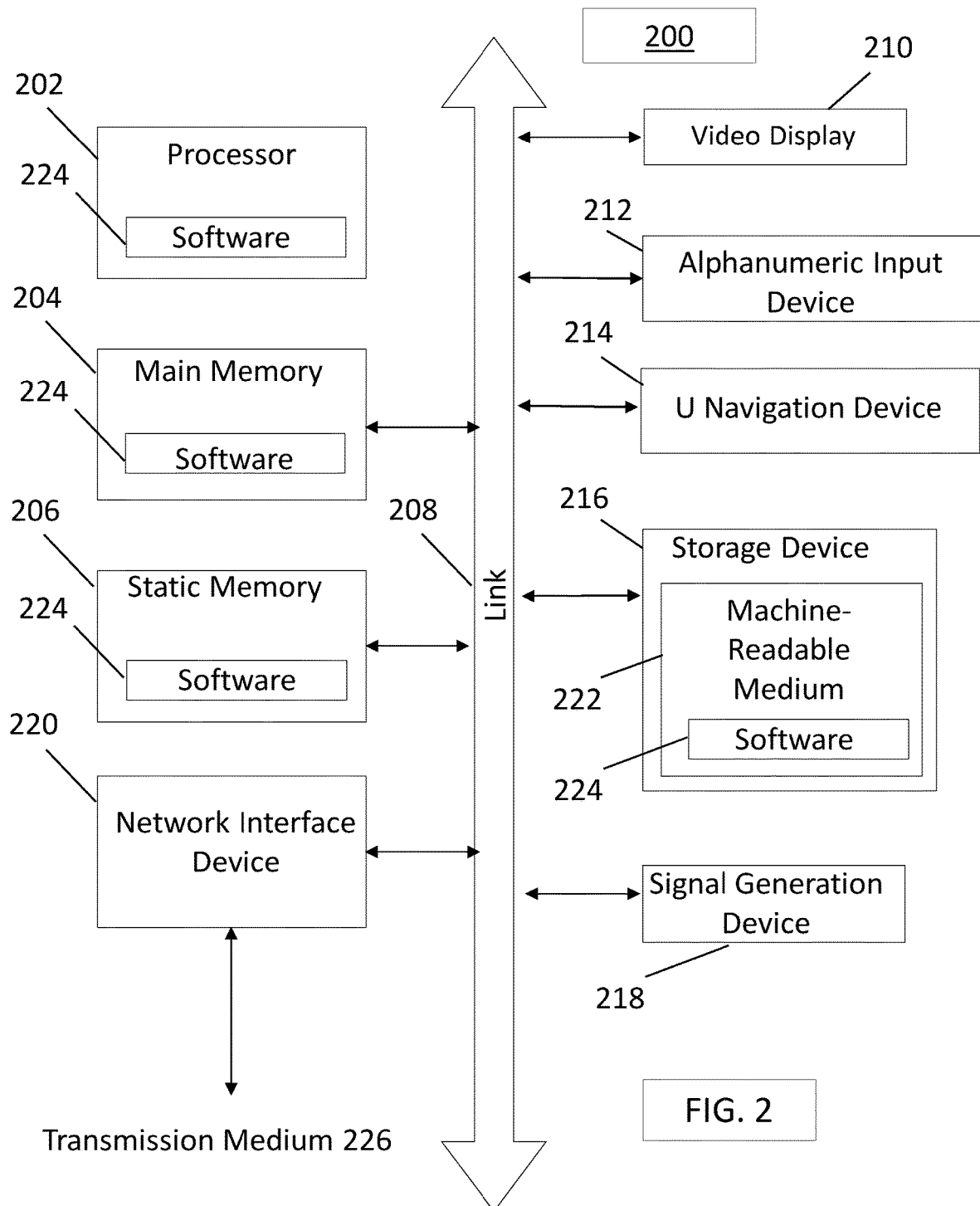
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst®, Unlicensed Mobile Access (UMA), also referred to as also referred to as 3GPP Generic Access Network, or GAN standard), Zigbee®, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHZ)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHZ, 2300-2400 MHz, 2.4-2.4835 GHz (note: it is an ISM band with global availability and it is used by Wi-Fi® technology family (11b/g/n/ax) and also by Bluetooth®), 2500-2690 MHz, 698-790 MHz, 610-790 MHz, 3400-3600 MHZ, 3400-3800 MHZ, 3800-4200 MHz, 3.55-3.7 GHZ (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi® system is expected to include the 6 GHz spectrum as an operating band but it is noted that, as of December 2017, Wi-Fi® system is not yet allowed in this band. Regulation is expected to be finished in 2019-2020 time frame), IMT-advanced spectrum, IMT-2020 spectrum (expected to include 3600-3800 MHZ, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHZ, 29.1-29.25 GHZ, 31-31.3 GHZ, 37-38.6 GHz, 38.6-40 GHz, 42-42.5 GHZ, 57-64 GHZ, 71-76 GHZ, 81-86 GHz and 92-94 GHz, etc), the ITS (Intelligent Transport Systems) band of 5.9 GHZ (typically 5.85-5.925 GHz) and 63-64 GHz, bands currently allocated to WiGig such as WiGig Band 1 (57.24-59.40 GHZ), WiGig Band 2 (59.40-61.56 GHz) and WiGig Band 3 (61.56-63.72 GHZ) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

5G networks extend beyond the traditional mobile broadband services to provide various new services such as internet of things (IoT), industrial control, autonomous driving, mission critical communications, etc. that may have ultra-low latency, ultra-high reliability, and high data capacity requirements due to safety and performance concerns. Some of the features in this document are defined for the network side, such as APs, eNBs, NR or gNBs—note that this term is typically used in the context of 3GPP 5G and 6G communication systems, etc. Still, a UE may take this role as well and act as an AP, eNB, or gNB; that is some or all features defined for network equipment may be implemented by a UE.

As above, there are a number of 5G protocols and interfaces to be developed to support UEs with multiple USIMs. Various procedures for MUSIM UEs include Connection Release, Paging Cause, Paging Restriction, and Reject Paging. In particular, N1 NAS protocol is developed for supporting UE requests to the network for connection release, paging restrictions and reject paging.

5.6.1 Service request procedure (3GPP TS 24.501)

5.6.1.1 General

The service request procedure changes the 5GS Mobility Management (5GMM) mode from 5GMM-IDLE to 5GMM-CONNECTED mode. If the UE is not using 5GS services with control plane Cellular Internet of Things (CIoT) 5GS optimization, this procedure is used to request the establishment of user-plane resources for packet data unit (PDU) sessions established without user-plane resources. In latter case, the 5GMM mode can be the 5GMM-IDLE mode or the 5GMM-CONNECTED mode if the UE is to establish user-plane resources for PDU sessions. If the UE is using 5GS services with control plane CIoT 5GS optimization, this procedure can be used for UE-initiated transfer of user data via the control plane from 5GMM-IDLE mode. The lower layer indicates when the user-plane resources for PDU sessions are successfully established or released.

This procedure is used in a number of scenarios that involve both 3GPP access and non-3GPP access by the UE, as well as the UE mode. These scenarios include, for example, when: the network has downlink signaling pending over 3GPP access and the UE is in 5GMM-IDLE mode over 3GPP access; the network has downlink signaling pending over non-3GPP access, the UE is in 5GMM-IDLE mode over non-3GPP access and in 5GMM-IDLE or 5GMM-CONNECTED mode over 3GPP access; the UE has uplink signaling pending over 3GPP access and the UE is in 5GMM-IDLE mode over 3GPP access; the network has downlink user data pending over 3GPP access and the UE is in 5GMM-IDLE mode over 3GPP access; the network has downlink user data pending over non-3GPP access, the UE is in 5GMM-IDLE mode over non-3GPP access and in 5GMM-IDLE or 5GMM-CONNECTED mode over 3GPP access; the UE has user data pending over 3GPP access and the UE is in 5GMM-IDLE or 5GMM-CONNECTED mode over 3GPP access; the UE has user data pending over non-3GPP access and the UE is in 5GMM-CONNECTED mode over non-3GPP access; the UE in 5GMM-IDLE mode over non-3GPP access receives an indication from the lower layers of non-3GPP access that the access stratum connection is established between UE and network, if T3346 is not running; the UE in 5GMM-IDLE or 5GMM-CONNECTED mode over 3GPP access receives a request from the upper layers to perform emergency services fallback and performs emergency services fallback as specified in subclause 4.13.4.2 of 3GPP TS 23.502; the UE has to request resources for voice-to-anything (V2X) communication over PC5; a MUSIM-capable UE in 5GMM-CONNECTED mode requests the network to release the N1 non-access stratum (NAS) signaling connection due to activity on another USIM (in this case the UE optionally includes paging restriction information); or the MUSIM-capable UE in 5GMM-IDLE mode, when responding to paging, requests the network to reject paging due to activity on another USIM (as above, the UE optionally includes paging restriction information).

In some embodiments, this procedure may not be used for initiating user data transfer or PDU session management related signaling other than for performing a UE-requested PDU session release procedure related to a PDU session for Local Area Data Network (LADN) when the UE is located outside the LADN service area.

In narrowband (NB)-N1 mode (a narrowband mode in which the UE allows access to the 5G core network via the 5G access network), this procedure may not be used to request the establishment of user-plane resources: a) for a number of PDU sessions that exceeds the UE's maximum number of supported user-plane resources if there is currently: 1) no user-plane resources established for the UE, and 2) user-plane resources established for: i) one PDU session and the multiple user-plane resources support bit was set to "Multiple user-plane resources not supported" in the 5GMM capability IE; or ii) two PDU sessions and the multiple user-plane resources support bit was set to "Multiple user-plane resources supported" in the 5GMM capability IE; or b) for additional PDU sessions, if the number of PDU sessions for which user-plane resources are currently established is equal to the UE's maximum number of supported user-plane resources.

The service request procedure is initiated by the UE. However, the service request procedure can be triggered by the network by: the paging procedure for the transfer of downlink signaling or user data pending over 3GPP access to a UE in 5GMM-IDLE mode over 3GPP access; the paging procedure for the transfer of downlink signaling or user data pending over non-3GPP access to a UE in 5GMM-IDLE mode over 3GPP access and in 5GMM-IDLE mode over non-3GPP access; the notification procedure for the transfer of downlink signaling or user data pending over non-3GPP access to a UE in 5GMM-CONNECTED mode over 3GPP access and in 5GMM-IDLE mode over non-3GPP access; or the notification procedure for the transfer of downlink signaling or user data pending over 3GPP access to a UE in 5GMM-IDLE mode over 3GPP access and in 5GMM-CONNECTED mode over non-3GPP access. In embodiments in which the UE is in 5GMM-IDLE mode over 3GPP access and in 5GMM-CONNECTED mode over non-3GPP access and downlink signaling or user data pending over 3GPP access is to be transferred, the AMF can trigger either the notification procedure or the paging procedure based on implementation.

The UE invokes the service request procedure when: a) the UE, in 5GMM-IDLE mode over 3GPP access, receives a paging request from the network; b) the UE, in 5GMM-CONNECTED mode over 3GPP access, receives a notification from the network with access type indicating non-3GPP access; c) the UE, in 5GMM-IDLE mode over 3GPP access, has uplink signaling pending (except in case i); d) the UE, in 5GMM-IDLE mode over 3GPP access, has uplink user data pending (except in case j); e) the UE, in 5GMM-CONNECTED mode or in 5GMM-CONNECTED mode with RRC inactive indication, has user data pending due to no user-plane resources established for PDU session(s) used for user data transport; f) the UE in 5GMM-IDLE mode over non-3GPP access, with T3346 not active or upon expiry of T3346, receives or has already received an indication from the lower layers of non-3GPP access, that the access stratum connection is established between UE and network; g) the UE, in 5GMM-IDLE mode over 3GPP access, receives a notification from the network with access type indicating 3GPP access when the UE is in 5GMM-CONNECTED mode over non-3GPP access; h) the UE, in 5GMM-IDLE, 5GMM-CONNECTED mode over 3GPP access, or 5GMM-CONNECTED mode with RRC inactive indication, receives a request from the upper layers to perform emergency services fallback and performs emergency services fallback as specified in subclause 4.13.4.2 of 3GPP TS 23.502; i) the UE, in 5GMM-CONNECTED mode over 3GPP access or in 5GMM-CONNECTED mode with RRC inactive indication, receives a fallback indication from the lower layers (see subclauses 5.3.1.2 and 5.3.1.4 of TS 24.501) and the UE has a pending NAS procedure other than a registration, service request, or de-registration procedure; j) the UE, in 5GMM-CONNECTED mode over 3GPP access or in 5GMM-CONNECTED mode with RRC inactive indication, receives a fallback indication from the lower layers (see subclauses 5.3.1.2 and 5.3.1.4 of TS 24.501) and the UE has pending uplink user data for PDU session(s) with user-plane resources already established but no pending NAS procedure; k) the UE, in 5GMM-CONNECTED mode and has a NAS signaling connection only, is using 5GS services with control plane CIoT 5GS optimization and has pending user data to be sent via user-plane resources; l) the UE in 5GMM-IDLE mode over 3GPP access has to request resources for V2X communication over PC5 (see 3GPP TS 23.287); xy) the MUSIM-capable UE in 5GMM-CONNECTED mode requests the network to release the N1 NAS signaling connection due to activity on another MUSIM (the UE optionally includes paging restriction information); or xz) the MUSIM-capable UE in 5GMM-IDLE mode when responding to paging requests the network to reject paging due to activity on another USIM (the UE optionally includes paging restriction information).

If one of the above criteria to invoke the service request procedure is fulfilled, then the service request procedure is only initiated by the UE when the following conditions are fulfilled: the 5GS update status of the UE is 5U1 UPDATED, and the TAI of the current serving cell is included in the TAI list; and no 5GMM-specific procedure is ongoing. The UE may not invoke the service request procedure when the UE is in the state 5GMM-SERVICE-REQUEST-INITIATED.

Figure 3A:
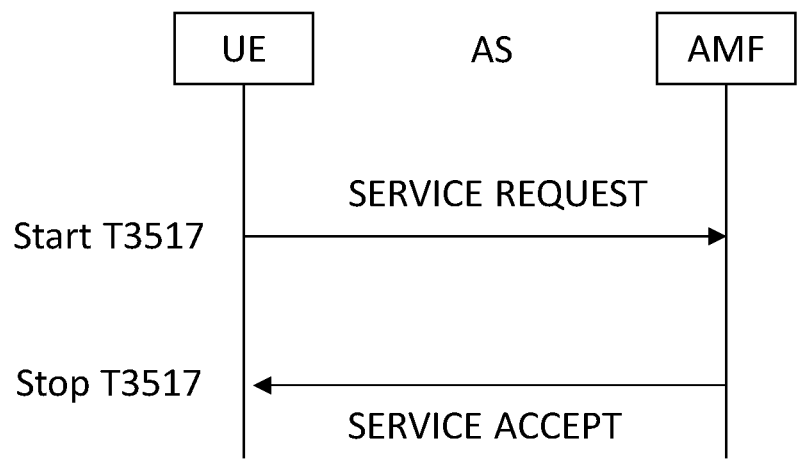
FIG. 3A illustrates a service request procedure in accordance with some embodiments.
Figure 3B:
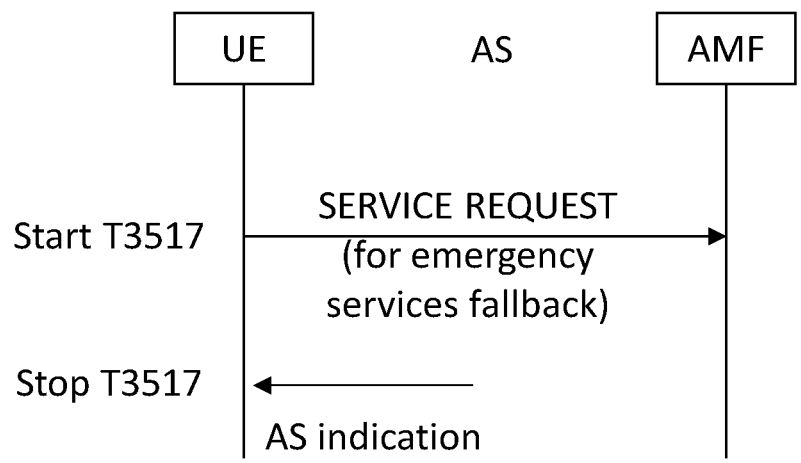
FIG. 3B illustrates another service request procedure in accordance with some embodiments.
Figure 3C:
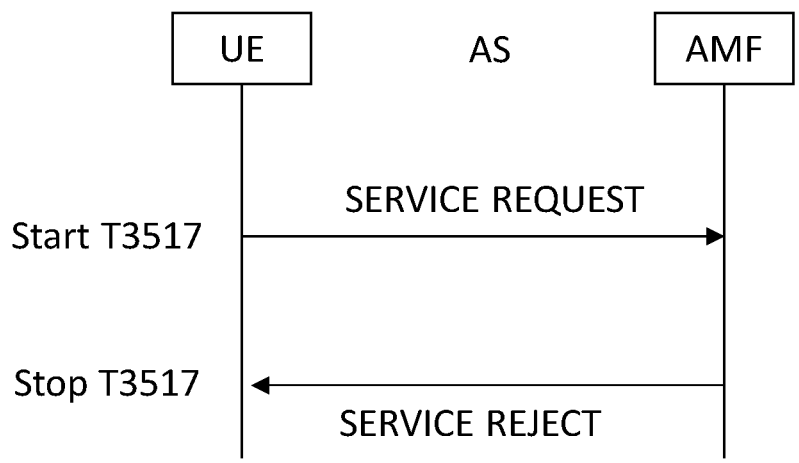
FIG. 3C illustrates another service request procedure in accordance with some embodiments.
Figure 4A:
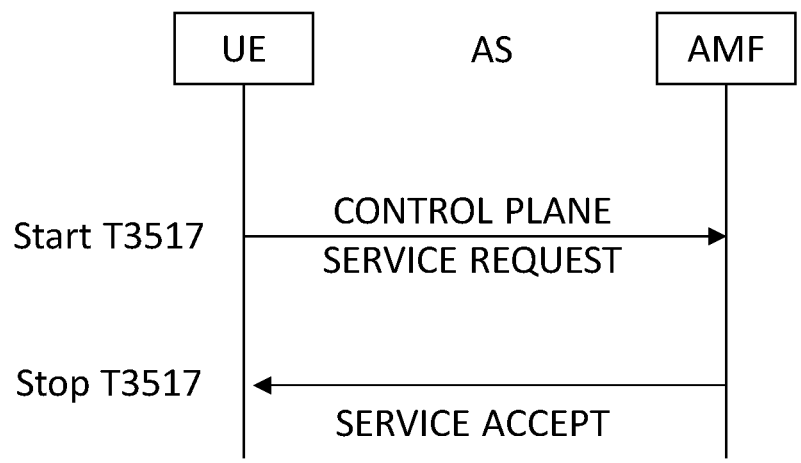
FIG. 4A illustrates a service request procedure in accordance with some embodiments.
Figure 4B:
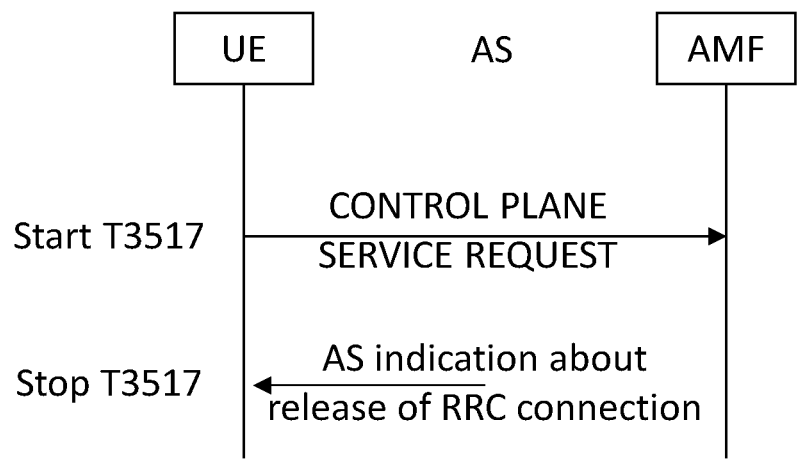
FIG. 4B illustrates another service request procedure in accordance with some embodiments.
Figure 4C:
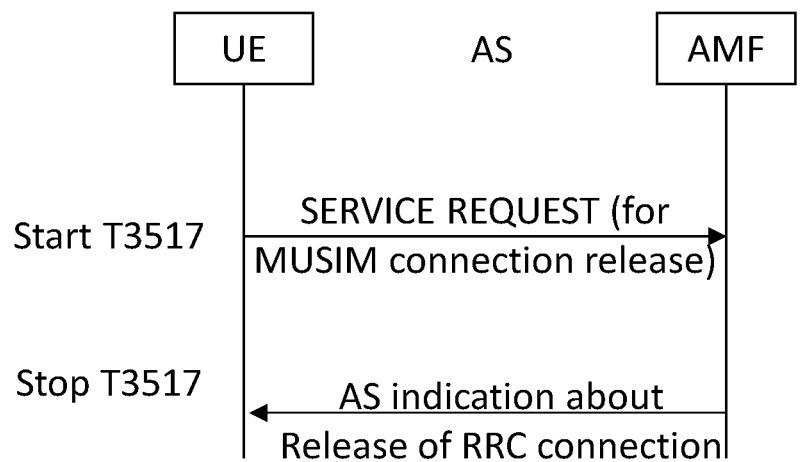
FIG. 4C illustrates another service request procedure in accordance with some embodiments.

FIG. 3A illustrates a service request procedure in accordance with some embodiments. FIG. 3B illustrates another service request procedure in accordance with some embodiments. FIG. 3C illustrates another service request procedure in accordance with some embodiments. FIG. 4A illustrates a service request procedure in accordance with some embodiments. FIG. 4B illustrates another service request procedure in accordance with some embodiments. FIG. 4C illustrates another service request procedure in accordance with some embodiments. A service request attempt counter is used to limit the number of service request attempts and no response from the network. The service request attempt counter may be incremented as specified in subclause 5.6.1.7 of 3GPP TS 23.501. The transmissions are through the access stratum, as shown in the above figures.

The service request attempt counter may be reset when: a registration procedure for mobility and periodic registration update is successfully completed; a service request procedure is successfully completed; a service request procedure is rejected as specified in subclause 5.6.1.5 or subclause 5.3.20 of 3GPP TS 23.501; or the UE moves to 5GMM-DEREGISTERED state.

5.6.1.2 Service request procedure initiation (TS 24.501)
5.6.1.2.1 UE is not using 5GS services with control plane CIoT 5GS optimization The UE initiates the service request procedure by sending a SERVICE REQUEST message to the AMF and starts timer T3517.

If the UE is sending the SERVICE REQUEST message from 5GMM-IDLE mode and the UE is to send non-cleartext IEs, the UE sends the SERVICE REQUEST message including the NAS message container IE as described in subclause 4.4.6 (TS 24.501).

For cases a), b), and g) in subclause 5.6.1.1 of TS 24.501, the service type IE in the SERVICE REQUEST message is set to "mobile terminated services". For cases c), d), e), f), i), j) and l) in subclause 5.6.1.1 of TS 24.501, if the UE is a UE configured for high priority access in selected PLMN, the service type IE in the SERVICE REQUEST message is set to "high priority access".

For case a) in subclause 5.6.1.1 of TS 24.501: a) if the paging request includes an indication for non-3GPP access type, the Allowed PDU session status IE is included in the SERVICE REQUEST message. If the UE has established the PDU session(s) associated with the S-NSSAI(s) which are included in the allowed NSSAI for 3GPP access, the UE indicates the PDU session(s) for which the UE allows the user-plane resources to be re-established over 3GPP access in the Allowed PDU session status IE. Otherwise, the UE does not indicate any PDU session(s) in the Allowed PDU session status IE; b) if the UE has uplink user data pending to be sent over 3GPP access, the Uplink data status IE is included in the SERVICE REQUEST message to indicate the PDU session(s) for which the UE has pending user data to be sent; or c) otherwise, the Uplink data status IE is not included in the SERVICE REQUEST message.

For case b) in subclause 5.6.1.1 of TS 24.501: a) the Allowed PDU session status IE is included in the SERVICE REQUEST message. If the UE has the PDU session(s) associated with the S-NSSAI(s) which are included in the allowed NSSAI for 3GPP access, the UE indicates the PDU session(s) for which the UE allows the user-plane resources to be re-established over 3GPP access in the Allowed PDU session status IE. Otherwise, the UE does not indicate any PDU session(s) in the Allowed PDU session status IE; b) if the UE has uplink user data pending to be sent over 3GPP access, the Uplink data status IE is included in the SERVICE REQUEST message to indicate the PDU session(s) for which the UE has pending user data to be sent; c) otherwise, the Uplink data status IE is not included in the SERVICE REQUEST message.

When the Allowed PDU session status IE is included in the SERVICE REQUEST message, the UE indicates that a PDU session is not allowed to be transferred to the 3GPP access if the 3GPP PS data off UE status is "activated" for the corresponding PDU session and the UE is not using the PDU session to send uplink IP packets for any of the 3GPP PS data off exempt services (see subclause 6.2.10 of TS 24.501).

For case c) in subclause 5.6.1.1 of TS 24.501, the Uplink data status IE is not included in the SERVICE REQUEST message except if the UE has one or more active always-on PDU sessions associated with the access type over which the SERVICE REQUEST message is sent. If the UE is not a UE configured for high priority access in selected PLMN and: a) if the SERVICE REQUEST message is triggered by a request for emergency services from the upper layer, the UE sets the service type IE in the SERVICE REQUEST message to "emergency services"; or b) otherwise, the UE sets the service type IE to "signaling".

When the UE is in a non-allowed area or is not in an allowed area as specified in subclause 5.3.5 of TS 24.501 and: a) if the uplink signaling pending is to indicate a change of 3GPP PS data off UE status for a PDU session, the UE sets the service type IE in the SERVICE REQUEST message to "elevated signaling", and does not include the Uplink data status IE in the SERVICE REQUEST message even if the UE has one or more active always-on PDU sessions associated with the access type over which the SERVICE REQUEST message is sent; or b) otherwise, the UE does not initiate service request procedure except for emergency services, high priority access or responding to paging or notification.

For cases d) and e) in subclause 5.6.1.1 of TS 24.501, the Uplink data status IE is included in the SERVICE REQUEST message to indicate the PDU session(s) the UE has pending user data to be sent. If the UE is not a UE configured for high priority access in selected PLMN: a) if there exists an emergency PDU session which is indicated in the Uplink data status IE the service type IE in the SERVICE REQUEST message is set to "emergency services"; or b) otherwise, the service type IE in the SERVICE REQUEST message is set to "data". For a UE in NB-N1 mode, the Uplink data status IE cannot be used to request the establishment of user-plane resources such that there will be user-plane resources established for a number of PDU sessions that exceeds the UE's maximum number of supported user-plane resources.

For case f) in subclause 5.6.1.1 of TS 24.501: a) if the UE has uplink user data pending to be sent, the Uplink data status IE is included in the SERVICE REQUEST message to indicate the PDU session(s) the UE has pending user data to be sent. If the UE is not a UE configured for high priority access in selected PLMN, the service type IE in the SERVICE REQUEST message is set to "data"; b) otherwise, if the UE is not a UE configured for high priority access in selected PLMN, the service type IE in the SERVICE REQUEST message is set to "signaling".

For case g) in subclause 5.6.1.1 of TS 24.501, if the UE has uplink user data pending to be sent, the Uplink data status IE is included in the SERVICE REQUEST message to indicate the PDU session(s) the UE has pending user data to be sent.

For case h) in subclause 5.6.1.1 of TS 24.501, the UE sends a SERVICE REQUEST message with service type set to "emergency services fallback" and without an Uplink data status IE.

For case i) in subclause 5.6.1.1 of TS 24.501, if the UE is not configured for high priority access in selected PLMN, the UE sets the Service type IE in the SERVICE REQUEST message as follows: a) if the pending message is an UL NAS TRANSPORT message with the Request type IE set to "initial emergency request" or "existing emergency PDU session", the UE sets the Service type IE in the SERVICE REQUEST message to "emergency services"; or b) otherwise, the UE sets the Service type IE in the SERVICE REQUEST message to "signaling".

For case j) in subclause 5.6.1.1 of TS 24.501: a) the UE includes the Uplink data status IE in the SERVICE REQUEST message indicating the PDU session(s) for which user-plane resources were active prior to receiving the fallback indication, if any; and b) if the UE is not a UE configured for high priority access in selected PLMN, the UE sets the Service type IE in the SERVICE REQUEST message as follows: 1) if there is an emergency PDU session which is indicated in the Uplink data status IE, the UE sets the Service type IE in the SERVICE REQUEST message to "emergency services"; or 2) if there is no emergency PDU session which is indicated in the Uplink data status IE, the UE sets the Service type IE in the SERVICE REQUEST message to "data".

For case 1) in subclause 5.6.1.1 of TS 24.501, if the UE is not a UE configured for high priority access in selected PLMN: a) if there exists an emergency PDU session which is indicated in the Uplink data status IE the service type IE in the SERVICE REQUEST message is set to "emergency services"; or b) otherwise, the service type IE in the SERVICE REQUEST message is set to "signaling".

If for a first embodiment, for case xy) in subclause 5.6.1.1 of TS 24.501, the UE sets the service type IE to "signaling", include the Connection release IE with the Connection release request type set to "Request to release N1 NAS signaling connection" in the SERVICE REQUEST message (the UE optionally includes the Paging restriction IE). For case xz) in subclause 5.6.1.1 of TS 24.501, the UE sets the service type IE to "signaling", include the Paging reject IE with the Paging reject request type set to "Request to reject paging" in the SERVICE REQUEST message (the UE optionally includes the Paging restriction IE).

Otherwise, if for a second embodiment, for case xy) in subclause 5.6.1.1 of TS 24.501, the UE sets the service type IE to "signaling", include the Connection release IE with the Connection release request type set to "Request to release N1 NAS signaling connection" or "Request to release N1 NAS signaling connection with paging restriction information" in the SERVICE REQUEST message. For case xz) in subclause 5.6.1.1 of TS 24.501, the UE sets the service type IE to "signaling", include the Paging reject IE with the Paging reject request type set to "Request to reject paging" or "Request to reject paging with paging restriction information" in the SERVICE REQUEST message.

Otherwise, if for a third embodiment, for case xy) in subclause 5.6.1.1 of TS 24.501, the UE sets the service type IE to "signaling", include the MUSIM request IE (also called UE request type IE) with the MUSIM request type (also called Request type) set to "Request to release N1 NAS signaling connection" (also called "NAS signaling connection release") in the SERVICE REQUEST message (the UE optionally includes the Paging restriction IE). For case xz) in subclause 5.6.1.1 of TS 24.501, the UE sets the service type IE to "mobile terminated services", include the MUSIM request IE with the MUSIM request type set to "Request to reject paging" (also called "Rejection of paging") in the SERVICE REQUEST message (the UE optionally includes the Paging restriction IE).

Otherwise, if for a fourth embodiment, for case xy) in subclause 5.6.1.1 of TS 24.501, the UE sets the service type IE to "signaling", include the MUSIM request IE with the MUSIM request type set to "Request to release N1 NAS signaling connection" or "Request to release N1 NAS signaling connection with paging restriction information" in the SERVICE REQUEST message. For case xz) in subclause 5.6.1.1 of TS 24.501, the UE sets the service type IE to "signaling", include the MUSIM request IE with the MUSIM request type set to "Request to reject paging" or "Request to reject paging with paging restriction information" in the SERVICE REQUEST message.

The UE includes a valid 5G-Serving Temporary Mobile Subscriber Identity (S-TMSI) in the 5G-S-TMSI IE of the SERVICE REQUEST message. If the UE has one or more active always-on PDU sessions associated with the access type over which the SERVICE REQUEST message is sent and the user-plane resources for these PDU sessions are not established, the UE includes the Uplink data status IE in the SERVICE REQUEST message and indicate that the UE has pending user data to be sent for those PDU sessions. If the UE has one or more active PDU sessions which are not accepted by the network as always-on PDU sessions and no uplink user data pending to be sent for those PDU sessions, the UE does not include those PDU sessions in the Uplink data status IE in the SERVICE REQUEST message.

The Uplink data status IE may be included in the SERVICE REQUEST message to indicate which PDU session(s) associated with the access type the SERVICE REQUEST message is sent over have pending user data to be sent.

The PDU session status information element may be included in the SERVICE REQUEST message to indicate: the single access PDU session(s) not in 5GSM state PDU SESSION INACTIVE in the UE associated with the access type the SERVICE REQUEST message is sent over; and the MA PDU session(s) not in 5GSM state PDU SESSION INACTIVE and having user plane resources established in the UE on the access the SERVICE REQUEST message is sent over.

If the SERVICE REQUEST message includes a NAS message container IE, the AMF processes the SERVICE REQUEST message that is obtained from the NAS message container IE as described in subclause 4.4.6 of TS 24.501.

If the UE has an emergency PDU session over the non-current access, the UE does not initiate the SERVICE REQUEST message with the service type IE set to "emergency services" over the current access, unless the SERVICE REQUEST message has to be initiated to perform handover of an existing emergency PDU session from the non-current access to the current access. Transfer of an existing emergency PDU session between 3GPP access and non-3GPP access is used, e.g., if the UE determines that the current access is no longer available.

5.6.1.2.2 UE is using 5GS services with control plane CIoT 5GS optimization

The UE sends a CONTROL PLANE SERVICE REQUEST message, starts T3517 and enters the state 5GMM-SERVICE-REQUEST-INITIATED. For case a), and case b) in subclause 5.6.1.1 of TS 24.501, the Control plane service type of the CONTROL PLANE SERVICE REQUEST message indicates "mobile terminating request". If: a) the UE only has uplink CIoT user data or SMS to be sent, the UE: 1) if the data size is not more than 254 octets and there is no other optional IE to be included in the message: i) for sending CIoT user data, set the Data type field to "control plane user data", include the PDU session ID, data, and Downlink Data Expected (DDX) (if available), in the CIoT small data container IE; and ii) for sending SMS, set the Data type field to "SMS", include SMS in the CIoT small data container IE; and 2) otherwise if the data size is more than 254 octets or there are other optional IEs to be included in the message: i) for sending CIoT user data, set the Payload container type IE to "CIoT user data container", include the PDU session ID in the PDU session ID IE and include data in the Payload container IE as described in subclause 5.4.5.2.2 of TS 24.501; and ii) for sending SMS, set the Payload container type IE to "SMS" and include data in the Payload container IE as described in subclause 5.4.5.2.2 of TS 24.501; and b) the paging request includes an indication for non-3GPP access type, the UE has at least one PDU session that is not associated with control plane only indication, the Allowed PDU session status IE is included in the CONTROL PLANE SERVICE REQUEST message. The term DDX corresponds to the term NAS RAI used in 3GPP TS 23.502.

For case c), and case d) if the UE has pending CIoT user data that is to be sent via the control plane in subclause 5.6.1.1 of TS 24.501, the UE sets the Control plane service type of the CONTROL PLANE SERVICE REQUEST message to "mobile originating request". If the UE has only uplink CIoT user data, SMS or location services message to be sent, the UE: a) if the data size is not more than 254 octets, there is no other optional IE to be included in the CONTROL PLANE SERVICE REQUEST message, and the data being sent is: 1) CIoT user data, set the Data type field to "control plane user data", include the PDU session ID, data, and DDX (if available), in the CIoT small data container IE; 2) location services message, set the Data type field to "Location services message container" and DDX, if available, in the CIoT small data container IE, and: i) if routing information is provided by upper layers: A) set the length of additional information field in the CIoT small data container IE to the length of routing information provided by upper layer location services application (see subclause 9.11.3.67 of TS 24.501), and set the additional information field in the CIoT small data container IE to the routing information provided by upper layer location services application (see subclause 9.11.3.67 of TS 24.501); or B) otherwise set the length of additional information field in the CIoT small data container IE to zero. In this case the Additional information field of the CIoT small data container IE is not included; and ii) set the Data contents field of the CIoT small data container IE to the location services message payload; or 3) SMS, set the Data type field to "SMS", include SMS in the CIoT small data container IE; or b) otherwise if the data size is more than 254 octets or there are other optional IEs to be included in the CONTROL PLANE SERVICE REQUEST message, and the data being sent is: 1) CIoT user data, set the Payload container type IE to "CIoT user data container", include the PDU session ID in the PDU session ID IE and include data in the Payload container IE as described in subclause 5.4.5.2.2 of TS 24.501; 2) location services message, set the Payload container type IE to "Location services message container", include data in the Payload container IE as described in subclause 5.4.5.2.2 of TS 24.501. If the upper layer location services application provides the routing information set the Additional information IE to the routing information as described in subclause 5.4.5.2.2 of TS 24.501; or 3) SMS, set the Payload container type IE to "SMS" and include data in the Payload container IE as described in subclause 5.4.5.2.2 of TS 24.501

For case a), and case b) in subclause 5.6.1.1 of TS 24.501, if the UE has pending user data that is to be sent via the user plane, the UE sets the Control plane service type of the CONTROL PLANE SERVICE REQUEST message to "mobile terminating request". The UE includes the Uplink data status IE in the CONTROL PLANE SERVICE REQUEST message to indicate which PDU session(s) have pending user data to be sent via user-plane resources.

For case c) in subclause 5.6.1.1 of TS 24.501, if the UE is in WB-N1 mode and the CONTROL PLANE SERVICE REQUEST message is triggered by a request for emergency services from the upper layer, the UE sets the Control plane service type of the CONTROL PLANE SERVICE REQUEST message to "emergency services".

For cases d) and k), if the UE has pending user data that is to be sent via the user plane in subclause 5.6.1.1 of TS 24.501: a) and if there exists an emergency PDU session which is indicated in the Uplink data status IE, the UE sets the Control plane service type of the CONTROL PLANE SERVICE REQUEST message to "emergency services"; or b) otherwise, the UE sets the Control plane service type to "mobile originating request". The UE includes the Uplink data status IE in the CONTROL PLANE SERVICE REQUEST message to indicate which PDU session(s) have pending user data to be sent via user-plane resources. For a UE in NB-N1 mode, the Uplink data status IE cannot be used to request the establishment of user-plane resources such that there will be user-plane resources established for a number of PDU sessions that exceeds the UE's maximum number of supported user-plane resources.

For case h) in subclause 5.6.1.1 of TS 24.501, if the UE is in WB-N1 mode and the UE does not have any PDU session that is associated with control plane only indication, the UE sends a CONTROL PLANE SERVICE REQUEST message with the Control plane service type set to "emergency services fallback" and without an Uplink data status IE.

For case i) in subclause 5.6.1.1 of TS 24.501, the Control plane service type of the CONTROL PLANE SERVICE REQUEST message indicates "mobile originating request". If the pending message is an UL NAS TRANSPORT message with the Payload container type IE set to: a) "SMS", "Location services message container", or "CIoT user data container", the UE sends the CONTROL PLANE SERVICE REQUEST and include the SMS, location services message, or CIoT user data as described in this subclause; or b) otherwise, the UE sends the CONTROL PLANE SERVICE REQUEST: 1) without including the CIoT small data container IE and without including the NAS message container IE if the UE has no other optional IE to be sent; or 2) with the NAS message container IE if the UE has an optional IE to be sent as described in this subclause.

For case j) in subclause 5.6.1.1 of TS 24.501, the Control plane service type of the CONTROL PLANE SERVICE REQUEST message indicates "mobile originating request". The UE includes the Uplink data status IE in the CONTROL PLANE SERVICE REQUEST message indicating the PDU session(s) for which user-plane resources were active prior to receiving the fallback indication, if any.

If for the first embodiment, for case xy) in subclause 5.6.1.1 of TS 24.501, the UE sets the service type IE to "mobile originating request", and includes the Connection release IE with the Connection release request type set to "Request to release N1 NAS signaling connection" in the SERVICE REQUEST message (the UE optionally includes the Paging restriction IE). For case xz) in subclause 5.6.1.1 of TS 24.501, the UE sets the service type IE to "mobile terminating request", and includes the Paging reject IE with the Paging reject request type set to "Request to reject paging" in the SERVICE REQUEST message (the UE optionally includes the Paging restriction IE).

Otherwise, if for the second embodiment, for case xy) in subclause 5.6.1.1 of TS 24.501, the UE sets the service type IE to "mobile originating request", include the Connection release IE with the Connection release request type set to "Request to release N1 NAS signaling connection" or "Request to release N1 NAS signaling connection with paging restriction information" in the SERVICE REQUEST message. For case xz) in subclause 5.6.1.1 of TS 24.501, the UE sets the service type IE to "mobile terminating request", and includes the Paging reject IE with the Paging reject request type set to "Request to reject paging" or "Request to reject paging with paging restriction information" in the SERVICE REQUEST message.

Otherwise, if for the third embodiment, for case xy) in subclause 5.6.1.1 of TS 24.501, the UE sets the service type IE to "mobile originating request", and includes the MUSIM request IE with the MUSIM request type set to "Request to release N1 NAS signaling connection" in the SERVICE REQUEST message (the UE optionally includes the Paging restriction IE). For case xz) in subclause 5.6.1.1 of TS 24.501, the UE sets the service type IE to "mobile terminating request", and includes the MUSIM request IE with the MUSIM request type set to "Request to reject paging" in the SERVICE REQUEST message (the UE optionally includes the Paging restriction IE).

Otherwise, if for the fourth embodiment, for case xy) in subclause 5.6.1.1 of TS 24.501, the UE sets the service type IE to "mobile originating request", and includes the MUSIM request IE with the MUSIM request type set to "Request to release N1 NAS signaling connection" or "Request to release N1 NAS signaling connection with paging restriction information" in the SERVICE REQUEST message. For case xz) in subclause 5.6.1.1 of TS 24.501, the UE sets the service type IE to "mobile terminating request", and includes the MUSIM request IE with the MUSIM request type set to "Request to reject paging" or "Request to reject paging with paging restriction information" in the SERVICE REQUEST message.

The UE may include the PDU session status IE in the CONTROL PLANE SERVICE REQUEST message to indicate which PDU session(s) associated with the access type the CONTROL PLANE SERVICE REQUEST message is sent over are active in the UE.

8.2.16 Service Request 8.2.16.1 Message Definition

The SERVICE REQUEST message is sent by the UE to the AMF in order to request the establishment of an N1 NAS signaling connection and/or to request the establishment of user-plane resources for PDU sessions which are established without user-plane resources. See table 8.2.16.1.1 of TS 24.501, replicated below.

Message type: SERVICE REQUEST

Significance: dual

Direction: UE to network

TABLE 8.2.16.1.1

SERVICE REQUEST message content

| IEI | Information Element | Type/ Reference | Presence | Format | Length |
|---|---|---|---|---|---|
| | Extended protocol discriminator | Extended protocol discriminator 9.2 | M | V | 1 |
| | Security header type | Security header type 9.3 | M | V | 1/2 |
| | Spare half octet | Spare half octet 9.5 | M | V | 1/2 |
| | Service request message identity | Message type 9.7 | M | V | 1 |
| | ngKSI | NAS key set identifier 9.11.3.32 | M | V | 1/2 |
| | Service type | Service type 9.11.3.50 | M | V | 1/2 |
| | 5G-S-TMSI | 5GS mobile identity 9.11.3.4 | M | LV-E | 9 |
| 40 | Uplink data status | Uplink data status 9.11.3.57 | O | TLV | 4-34 |
| 50 | PDU session status | PDU session status 9.11.3.44 | O | TLV | 4-34 |
| 25 | Allowed PDU session status | Allowed PDU session status 9.11.3.13 | O | TLV | 4-34 |
| 71 | NAS message container | NAS message container 9.11.3.33 | O | TLV-E | 4-n |
| If the first embodiment | | | | | |
| XY | Connection release | Connection release 9.11.3.XX | O | TLV | 3 |
| XY | Paging reject | Paging reject 9.11.3.XY | O | TLV | 3 |
| ZZ | Paging restriction | Paging restriction 9.11.3.ZZ | O | TLV | 3-5 |
| Alternately, if the second embodiment | | | | | |
| XY | Connection release | Connection release 9.11.3.XX | O | TLV | 3-6 |
| XY | Paging reject | Paging reject 9.11.3.XY | O | TLV | 3-6 |
| Alternately, if the third embodiment | | | | | |
| YY | MUSIM request | MUSIM request 9.11.3.YY | O | TLV | 3 |
| ZZ | Paging restriction | Paging restriction 9.11.3.ZZ | O | TLV | 3-5 |
| Alternately, if the fourth embodiment | | | | | |
| YY | MUSIM request | MUSIM request 9.11.3.YY | O | TLV | 3-6 |

If the first or second embodiment:

8.2.16.X Connection Release

This IE is included in the SERVICE REQUEST message if the MUSIM-capable UE requests the network to release the N1 NAS signaling connection and optionally restrict paging.

8.2.16.X Paging Reject

This IE is included in the SERVICE REQUEST message if the MUSIM-capable UE requests the network to reject paging and optionally restrict paging.

If the first embodiment:

8.2.16.Y Paging Restriction

This IE is included in the SERVICE REQUEST message if the UE requests the network to restrict paging. This IE is only included in case the Connection release IE with Connection release request type set to "Request to release N1 NAS signaling connection" or the Paging reject IE with the Paging reject request type set to "Request to reject paging" is also included.

If the third or fourth embodiment:

8.2.16.X MUSIM Request

This IE is included in the SERVICE REQUEST message if the MUSIM-capable UE requests the network to release the N1 NAS signaling connection or to reject paging and optionally restrict paging.

8.2.16.Y Paging Restriction

This IE is included in the SERVICE REQUEST message if the UE requests the network to restrict paging. This IE is only included in case the MUSIM request IE with Connection release request type set to "Request to release N1 NAS signaling connection" or "Request to reject paging" is also included.

If the first embodiment:

8.2.16.Y Paging Restriction

This IE is included in the SERVICE REQUEST message if the UE requests the network to restrict paging. This IE is only included in case the Connection release IE with Connection release request type set to "Request to release N1 NAS signaling connection" or the Paging reject IE with the Paging reject request type set to "Request to reject paging" is also included.

9.11.3.XX Connection Release

The purpose of the Connection release information element is to indicate to the network to release the N1 NAS signaling connection and optional include Paging restriction information. The Connection release information element is coded as shown in the connection release information element and table 9.11.3.XX.1 below. The Connection release information element is a type 4 information element with a length of 3 octets.

| Connection release information element | | | | | | | | |
|---|---|---|---|---|---|---|---|---|
| 8 | 7 | 6 | 5 | 4 | 3 | 2 | 1 | |
| Connection release IEI | | | | | | | | octet 1 |
| Length of Connection release contents | | | | | | | | octet 2 |
| 0 | 0 | 0 | 0 | Connection release request type | | | | octet 3 |
| Spare | Spare | Spare | Spare | | | | | |

TABLE 9.11.3.XX.1

Connection release information element

Value part of the Connection release information element
(octet 3)
Connection release request type (octet 3)
Bits
4 3 2 1
0 0 0 1 Request to release N1 NAS signaling
connection
All other values is interpreted as reserved and is coded as 0 by
this version of the protocol 9.11.3.XX Connection Release (if the Second Embodiment)

The purpose of the Connection release information element is to indicate to the network to release the N1 NAS signaling connection and optional include Paging restriction information. The Connection release information element is coded as shown below and table 9.11.3.XX.1. The Connection release information element is a type 4 information element with minimum length of 3 octets and a maximum length of 6 octets.

| Connection release information element | | | | | | | |
|---|---|---|---|---|---|---|---|
| 8 | 7 | 6 | 5 | 4 | 3 | 2 | 1 |
| Connection release IEI | | | | | | | octet 1 |
| Length of Connection release contents | | | | | | | octet 2 |
| 0 | 0 | 0 | 0 | Connection release request type | | | octet 3 |
| Spare | Spare | Spare | Spare | | | | |
| 0 | 0 | 0 | 0 | Paging restriction type | | | octet 4* |
| Spare | Spare | Spare | Spare | | | | |
| PSI (7) | PSI (6) | PSI (5) | PSI (4) | PSI (3) | PSI (2) | PSI (1) | PSI (0) | octet 5* |
| PSI (15) | PSI (14) | PSI (13) | PSI (12) | PSI (11) | PSI (10) | PSI (9) | PSI (8) | octet 6* |

TABLE 9.11.3.XX.1

Connection release information element

Value part of the Connection release information element
(octets 3 to 6)
Connection release request type (octet 3)
Bits
4 3 2 1
0 0 0 1 Request to release N1 NAS signaling connection
0 0 1 0 Request to release N1 NAS signaling
connection with paging restriction information
All other values is interpreted as reserved and is coded
as 0 by this version of the protocol
Paging restriction type (octet 4)
Bits
4 3 2 1
0 0 0 1 All paging is restricted
0 0 1 0 All paging is restricted, except paging for
voice service (IMS voice)
0 0 1 1 All paging is restricted, except for certain PDU
Session(s)
0 1 0 0 All paging is restricted, except paging for
voice service (IMS voice) and certain PDU
session(s)
All other values is interpreted as reserved and is
coded as 0 by this version of the protocol
PSI(x) (octets 5 to 6)
This field indicates the PDU sessions associated with PDU
session identity for which paging is restricted
PSI(0):
Bit 1 of octet 5 is spare and is coded as zero.

TABLE 9.11.3.XX.1-continued

Connection release information element

PSI(1)-PSI(15):
0 indicates that paging is restricted for the PDU session
associated with the PDU session identity.
1 indicates that paging is not restricted for the PDU
session associated with the PDU session identity.

9.11.3.XY Paging Reject (if the First Embodiment)

The purpose of the Paging reject information element is to reject paging. The Paging reject information element is coded as shown below and table 9.11.3.XY.1. The Paging reject information element is a type 4 information element with a length of 3 octets.

| Paging reject information element | | | | | | | |
|---|---|---|---|---|---|---|---|
| 8 | 7 | 6 | 5 | 4 | 3 | 2 | 1 |
| Paging reject IEI | | | | | | | octet 1 |
| Length of Paging reject contents | | | | | | | octet 2 |
| 0 | 0 | 0 | 0 | Paging reject request type | | | octet 3 |
| Spare | Spare | Spare | Spare | | | | |

TABLE 9.11.3.XY.1

Paging reject information element

Value part of the Paging reject information element (octet 3)
Paging reject request type (octet 3)
Bits
4 3 2 1
0 0 0 1 Request to reject paging
All other values is interpreted as reserved and is
coded as 0 by this version of the protocol 9.11.3.XY Paging Reject (if the Second Embodiment)

The purpose of the Paging reject information element is to reject paging and optional include Paging restriction information. The Paging reject information element is coded as shown and table 9.11.3.XY.1. The Paging reject information element is a type 4 information element with minimum length of 3 octets and a maximum length of 6 octets.

| Paging reject information element | | | | | | | |
|---|---|---|---|---|---|---|---|
| 8 | 7 | 6 | 5 | 4 | 3 | 2 | 1 |
| Paging reject IEI | | | | | | | octet 1 |
| Length of Paging reject contents | | | | | | | octet 2 |
| 0 | 0 | 0 | 0 | Paging reject request type | | | octet 3 |
| Spare | Spare | Spare | Spare | | | | |
| 0 | 0 | 0 | 0 | Paging restriction type | | | octet 4* |
| Spare | Spare | Spare | Spare | | | | |
| PSI (7) | PSI (6) | PSI (5) | PSI (4) | PSI (3) | PSI (2) | PSI (1) | PSI (0) | octet 5* |
| PSI (15) | PSI (14) | PSI (13) | PSI (12) | PSI (11) | PSI (10) | PSI (9) | PSI (8) | octet 6* |

TABLE 9.11.3.XY.1

Paging reject information element

Value part of the Paging reject information element
(octets 3 to 6)
Paging reject request type (octet 3)

TABLE 9.11.3.XY.1-continued

Paging reject information element

Bits
4 3 2 1
0 0 0 1 Request to reject paging
0 0 1 0 Request to reject paging with paging
restriction information
All other values is interpreted as reserved and is coded
as 0 by this version of the protocol
Paging restriction type (octet 4)
Bits
4 3 2 1
0 0 0 1 All paging is restricted
0 0 1 0 All paging is restricted, except paging for
voice service (IMS voice)
0 0 1 1 All paging is restricted, except for certain PDU
Session(s)
0 1 0 0 All paging is restricted, except paging for
voice service (IMS voice) and certain PDU
session(s)
All other values is interpreted as reserved and is coded
as 0 by this version of the protocol
PSI(x) (octets 5 to 6)
This field indicates the PDU sessions associated with PDU
session identity for which paging is restricted
PSI(0):
Bit 1 of octet 5 is spare and is coded as zero.
PSI(1)-PSI(15):
0 indicates that paging is restricted for the PDU session
associated with the PDU session identity.
1 indicates that paging is not restricted for the PDU
session associated with the PDU session identity.

9.11.3.YY MUSIM Request (if the Third Embodiment)

The purpose of the MUSIM request information element is to indicate to the network to release the N1 NAS signaling connection or to reject paging. The MUSIM request information element is coded as shown below and table 9.11.3.YY.1. The MUSIM request information element is a type 4 information element with a length of 3 octets.

| MUSIM request information element | | | | | | | | |
|---|---|---|---|---|---|---|---|---|
| 8 | 7 | 6 | 5 | 4 | 3 | 2 | 1 | |
| MUSIM request IEI | | | | | | | | octet 1 |
| Length of MUSIM request contents | | | | | | | | octet 2 |
| 0 | 0 | 0 | 0 | MUSIM request type | | | | octet 3 |
| Spare | Spare | Spare | Spare | | | | | |

TABLE 9.11.3.XX.1

MUSIM request information element

Value part of the MUSIM request information
element (octet 3)
MUSIM request type (octet 3)
Bits
4 3 2 1
0 0 0 1 Request to release N1 NAS signaling
connection
0 0 1 0 Request to reject paging
All other values is interpreted as reserved and is coded
as 0 by this version of the protocol 9.11.3.YY MUSIM Request (if the Fourth Embodiment)

The purpose of the MUSIM request information element is to indicate to the network to release the N1 NAS signaling connection or to reject paging and optional include paging restriction information. The MUSIM request information element is coded as shown and table 9.11.3.YY.1. The MUSIM request information element is a type 4 information element with minimum length of 3 octets and a maximum length of 6 octets.

| MUSIM request information element | | | | | | | | |
|---|---|---|---|---|---|---|---|---|
| 8 | 7 | 6 | 5 | 4 | 3 | 2 | 1 | |
| MUSIM request IEI | | | | | | | | octet 1 |
| Length of MUSIM request contents | | | | | | | | octet 2 |
| 0 | 0 | 0 | 0 | MUSIM request type | | | | octet 3 |
| Spare | Spare | Spare | Spare | | | | | |
| 0 | 0 | 0 | 0 | Paging restriction type | | | | octet 4* |
| Spare | Spare | Spare | Spare | | | | | |
| PSI (7) | PSI (6) | PSI (5) | PSI (4) | PSI (3) | PSI (2) | PSI (1) | PSI (0) | octet 5* |
| PSI (15) | PSI (14) | PSI (13) | PSI (12) | PSI (11) | PSI (10) | PSI (9) | PSI (8) | octet 6* |

TABLE 9.11.3.XX.1

MUSIM request information element

Value part of the MUSIM request information element
(octets 3 to 6)
MUSIM request type (octet 3)
Bits
4 3 2 1
0 0 0 1 Request to release N1 NAS signaling connection
0 0 1 0 Request to release N1 NAS signaling
connection with paging restriction information
0 0 1 1 Request to reject paging
0 1 0 0 Request to reject
paging with paging restriction information
All other values is interpreted as reserved and is coded
as 0 by this version of the protocol
Paging restriction type (octet 4)
Bits
4 3 2 1
0 0 0 1 All paging is restricted
0 0 1 0 All paging is restricted, except paging for
voice service (IMS voice)
0 0 1 1 All paging is restricted, except for certain PDU
Session(s)
0 1 0 0 All paging is restricted, except
paging for voice service (IMS voice)
and certain PDU session(s)
All other values is interpreted as reserved and is coded
as 0 by this version of the protocol
PSI(x) (octets 5 to 6)
This field indicates the PDU sessions associated with PDU
session identity for which paging is restricted
PSI(0):
Bit 1 of octet 5 is spare and is coded as zero.
PSI(1)-PSI(15):
0 indicates that paging is restricted for the PDU session
associated with the PDU session identity.
1 indicates that paging is not restricted for the PDU
session associated with the PDU session identity.

9.11.3.ZZ Paging Restriction (if the First or Third Embodiment)

The purpose of the Paging restriction information element is to provide paging restriction information. The Paging restriction information element is coded as shown below and table 9.11.3.ZZ.1. The Paging restriction information element is a type 4 information element with minimum length of 3 octets and a maximum length of 5 octets.

| Paging restriction information element | | | | | | | | |
|---|---|---|---|---|---|---|---|---|
| 8 | 7 | 6 | 5 | 4 | 3 | 2 | 1 | |
| Paging restriction IEI | | | | | | | | octet 1 |
| Length of Paging restriction content | | | | | | | | octet 2 |
| 0 | 0 | 0 | 0 | Paging restriction type | | | | octet 3 |
| Spare | Spare | Spare | Spare | | | | | |
| PSI (7) | PSI (6) | PSI (5) | PSI (4) | PSI (3) | PSI (2) | PSI (1) | PSI (0) | octet 4* |
| PSI (15) | PSI (14) | PSI (13) | PSI (12) | PSI (11) | PSI (10) | PSI (9) | PSI (8) | octet 5* |

TABLE 9.11.3.ZZ.1

Paging restriction information element

Value part of the Paging restriction information element
(octets 3 to 5)
Paging restriction type (octet 3)
Bits
4 3 2 1
0 0 0 1 All paging is restricted
0 0 1 0 All paging is restricted, except paging for
voice service (IMS voice)
0 0 1 1 All paging is restricted, except for certain PDU
Session(s)
0 1 0 0 All paging is restricted, except paging for
voice service (IMS voice) and certain PDU session(s)
All other values is interpreted as reserved and is coded
as 0 by this version of the protocol
PSI(x) (octets 4 to 5) This field indicates the
PDU sessions associated with PDU
session identity for which paging is restricted
PSI(0):
Bit 1 of octet 4 is spare and is coded as zero.
PSI(1)-PSI(15):
0 indicates that paging is restricted for the PDU session
associated with the PDU session identity.
1 indicates that paging is not restricted for the PDU
session associated with the PDU session identity.

Accordingly, various embodiments support multi-USIM UEs in 5GS, specifically UE-requested connection release, paging restriction, and paging reject. The UE sends an enhanced SERVICE REQUEST message with a new information element to indicate one or more of the services.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a multiple universal subscriber identity module (MUSIM) user equipment (UE), the apparatus comprising:
    processing circuitry configured to cause the UE to transmit:
        in a $5^{th}$ generation (5G) Mobility Management (5GMM)-CONNECTED mode, a first service request message to a network entity to invoke a service request procedure, the first service request message to request release of an N1 non-access stratum (NAS) signalling connection due to activity on another USIM; and
        in a 5GMM-IDLE mode, a second service request message to the network entity to invoke the service request procedure in response to reception of a paging request, the second service request message to reject the paging request due to activity on the other USIM; and
    a memory configured to store at least one UE identity.

2. The apparatus of claim 1, wherein the processing circuitry is configured to invoke the service request procedure to adjust a paging restriction.

3. The apparatus of claim 2, wherein the processing circuitry is configured to cause the UE to transmit the paging restriction in at least one of the first and second service request message.

4. The apparatus of claim 2, wherein the paging restriction is established through use of the service request procedure.

5. The apparatus of claim 1, wherein the processing circuitry is configured to:
  in the 5GMM-CONNECTED mode and not using 5G System (5GS) services with control plane Cellular Internet of Things (CIoT) 5GS optimization during invocation of the service request procedure, in the first service request message: set a Request type to NAS signalling connection release in a UE request type information element (IE), and a service type to signalling, and
  in the 5GMM-CONNECTED mode and using the 5GS services with CIoT 5GS optimization during invocation of the service request procedure, in the first service request message: set the Request type to NAS signalling connection release in the UE request type IE and a control plane service type IE to mobile originating request.

6. The apparatus of claim 5, wherein the processing circuitry is configured to:
  in the 5GMM-IDLE mode and not using the 5GS services with CIoT 5GS optimization during invocation of the service request procedure, in the second service request message: set the Request type to Rejection of paging in the UE request type IE and the service type to mobile terminated services, and
  in the 5GMM-IDLE mode and using the 5GS services with CIoT 5GS optimization during invocation of the service request procedure, in the second service request message: set the Request type to Rejection of paging in the UE request type IE and the control plane service type IE to mobile terminating request.

7. The apparatus of claim 6, wherein the UE request type IE in at least one of the first and second service request message is a type 4 IE that has a length of 3 octets.

8. The apparatus of claim 7, wherein the octets contain:
  a first octet that includes a UE request type Information Element Identifier (IEI) of the UE request type IE,
  a middle octet that includes a length of UE request type contents, and
  a last octet that includes the request type, which selectable from among a plurality of request types that include NAS signalling connection release and Rejection of paging.

9. The apparatus of claim 6, wherein at least one of the first and second service request message includes a paging restriction IE that includes a paging restriction request.

10. The apparatus of claim 9, wherein the paging restriction IE is a type 4 IE that has a minimum length of 3 octets.

11. The apparatus of claim 10, wherein the octets contain:
  a first octet that includes a paging restriction type Information Element Identifier (IEI) of the paging restriction type IE,
  a second octet that includes a length of paging restriction type contents, and
  a third octet that includes a paging restriction type.

12. The apparatus of claim 11, wherein the paging restriction type is selectable from among a group of paging restriction types that include: all paging is restricted and all paging is restricted except for paging for voice service.

13. The apparatus of claim 12, wherein the group of paging restriction types further include: all paging is restricted except for at least one specified packet data unit (PDU) session and all paging is restricted except paging for voice service and the at least one specified PDU session.

14. The apparatus of claim 13, wherein the paging restriction IE comprises a plurality of PDU session identity fields, each of which has a PDU session identity and indicates whether a PDU session associated with the PDU session identity is restricted.

15. The apparatus of claim 10, wherein the paging restriction IE has a maximum length of at least 5 octets.

16. The apparatus of claim 11, wherein the processing circuitry is configured to determine whether a network to which the UE is connected supports a reject paging request, and limit transmission of the second service request message to a determination that the network supports the reject paging request.

17. An apparatus for an access and mobility function (AMF), the apparatus comprising:
  processing circuitry configured to:
    cause the AMF to receive, from a multiple universal subscriber identity module (MUSIM) user equipment (UE) in a $5^{th}$ generation (5G) Mobility Management (5GMM)-CONNECTED mode, a first service request message to request release of an N1 non-access stratum (NAS) signalling connection due to activity on another USIM of the MUSIM UE; and
    cause the AMF to transmit, to the MUSIM UE in a 5GMM-IDLE mode, a paging request, and cause the AMF to receive, from the MUSIM UE in response to reception of the paging request, a second service request message to reject the paging request due to activity on the other USIM; and
  a memory configured to store at least one of the first and second service request message.

18. The apparatus of claim 17, wherein:
  in the 5GMM-CONNECTED mode and not using 5G System (5GS) services with control plane Cellular Internet of Things (CIoT) 5GS optimization during invocation of a service request procedure, the first service request message includes a Request type that indicates NAS signalling connection release in a UE request type IE and a service type that indicates signalling,
  in the 5GMM-CONNECTED mode and using the 5GS services with CIoT 5GS optimization during invocation of the service request procedure, the first service request message includes the Request type that indicates NAS signalling connection release in the UE request type IE and a control plane service type that indicates mobile originating request,
  in the 5GMM-IDLE mode and not using the 5GS services with CIoT 5GS optimization during invocation of the service request procedure, the second service request message includes the Request type that indicates Rejection of paging in the UE request type IE and the service type that indicates mobile terminated services, and
  in the 5GMM-IDLE mode and using the 5GS services with CIoT 5GS optimization during invocation of the service request procedure, the second service request message includes the Request type that indicates Rejection of paging in the UE request type IE and the service type that indicates mobile terminating request.

19. A non-transitory computer-readable storage medium that stores instructions for execution by one or more processors of a multiple universal subscriber identity module (MUSIM) user equipment (UE), the one or more processors to configure the MUSIM UE to, when the instructions are executed:
- in a 5$^{th}$ generation (5G) Mobility Management (5GMM)-CONNECTED mode, transmit a first service request message of a service request procedure to a network entity of a network, the first service request message to request release of an N1 non-access stratum (NAS) signalling connection due to activity on another USIM; and
- in a 5GMM-IDLE mode, transmit a second service request message of the service request procedure to the network entity in response to reception of a paging request from the network, the second service request message to reject the paging request due to activity on the other USIM.

20. The non-transitory computer-readable storage medium of claim 19, wherein the instructions, when executed, configured the one or more processors to:
- in the 5GMM-CONNECTED mode and not using 5GS services with control plane Cellular Internet of Things (CIoT) 5GS optimization during invocation of the service request procedure, in the first service request message: set a Request type to NAS signalling connection release in a UE request type information element (IE) and a service type to signalling,
- in the 5GMM-CONNECTED mode and using the 5GS services with CIoT 5GS optimization during invocation of the service request procedure, in the first service request message: set the Request type to NAS signalling connection release in the UE request type IE and a control plane service type IE to mobile originating request,
- in the 5GMM-IDLE mode and using the 5GS services with CIoT 5GS optimization during invocation of the service request procedure, in the second service request message: set the Request type to Rejection of paging in the UE request type IE and the control plane service type IE to mobile terminating request in the UE request type IE, and
- in the 5GMM-IDLE mode and using the 5GS services with CIoT 5GS optimization during invocation of the service request procedure, in the second service request message: set the UE request type IE to Rejection of paging and the service type to signalling in the UE request type IE.

* * * * *